FIG.1.

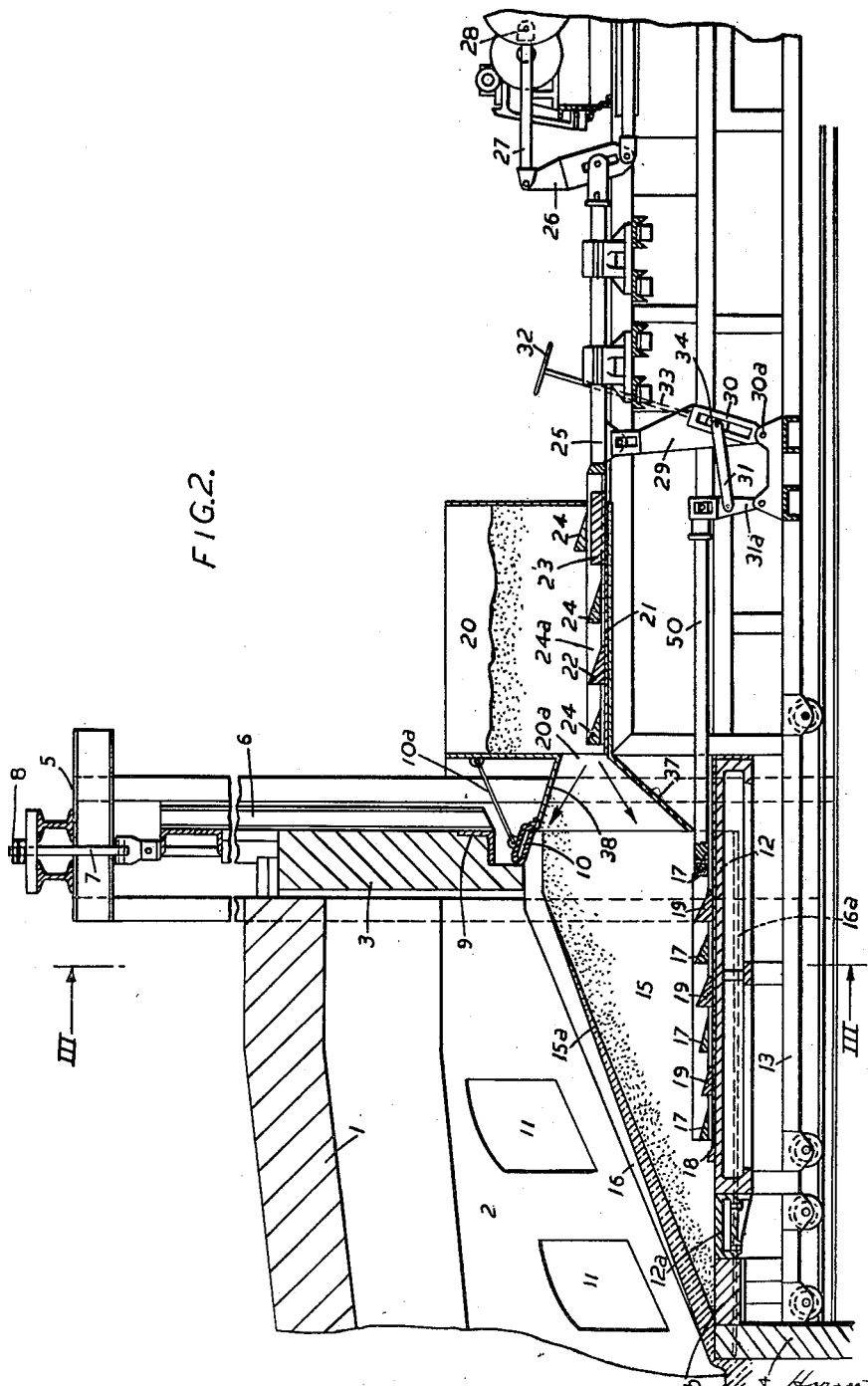

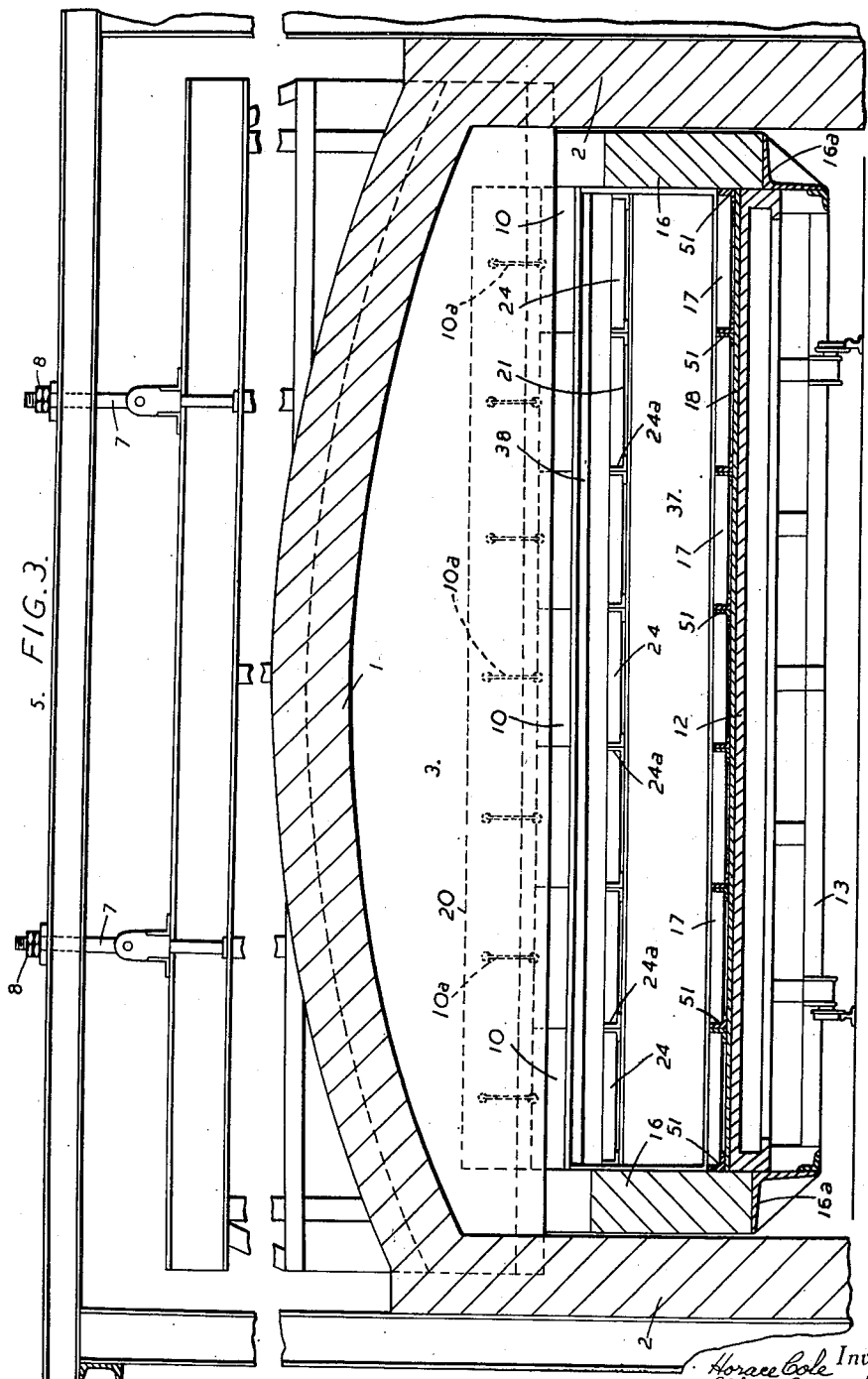

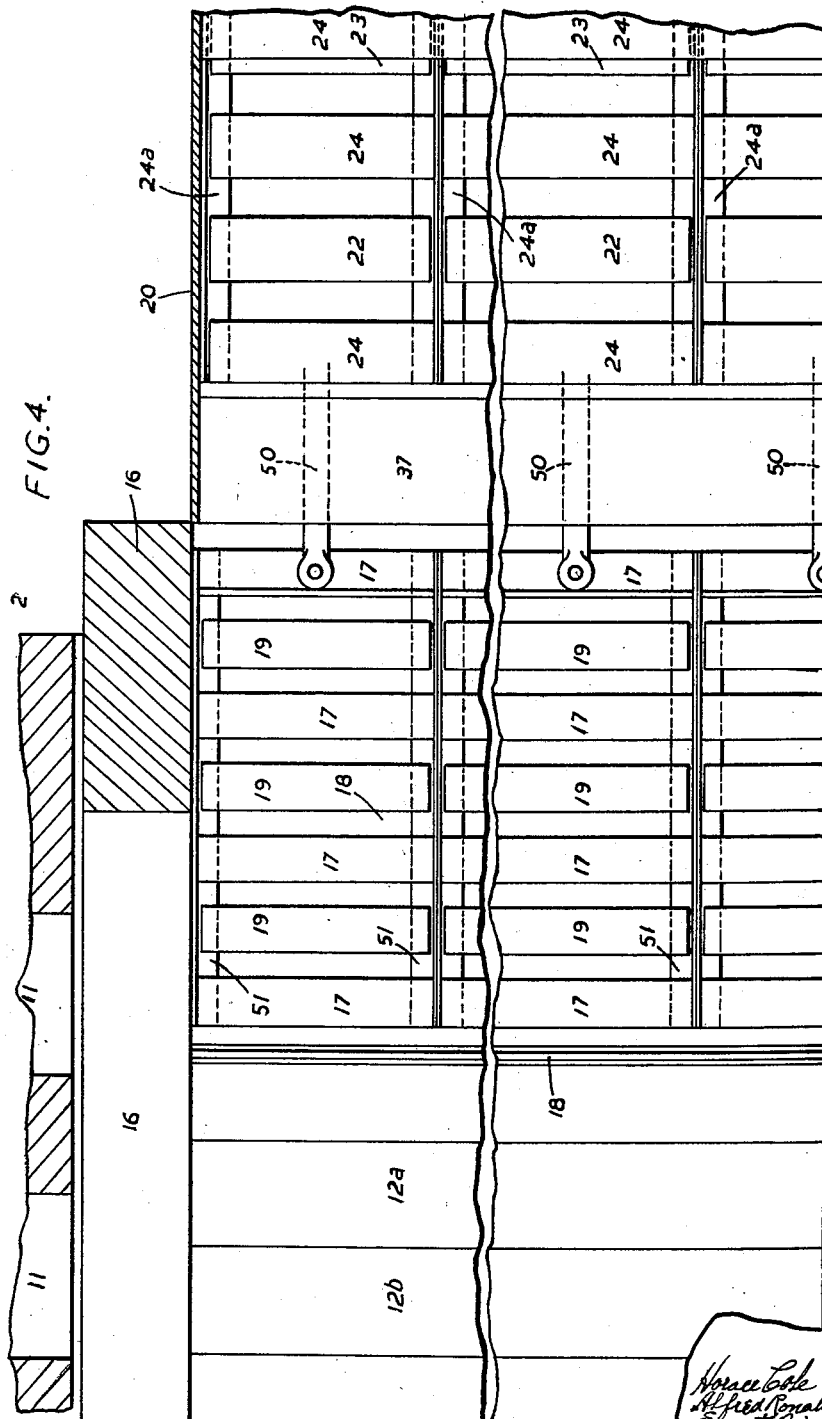

Patented Apr. 8, 1952

2,592,010

UNITED STATES PATENT OFFICE 2,592,010

APPARATUS FOR MELTING BATCH MATERIAL USED IN THE MANUFACTURE OF GLASS

Horace Cole, Saint Helens, Alfred R. Green, Rainford, and Ernest B. Le Mare and Robert F. Taylor, Allithwaite, England, assignors to Pilkington Brothers Limited, Liverpool, England, a British company Original application January 4, 1946, Serial No. 639,080. Divided and this application June 18, 1948, Serial No. 33,884. In Great Britain September 15, 1944

Section 1, Public Law 690, August 8, 1946
Patent expires September 15, 1964

19 Claims. (Cl. 49—54)

This invention relates to apparatus for melting glass, and is a division of application Serial No. 639,080 filed January 4, 1946, now abandoned.

In the customary continuous method of melting glass in a tank furnace, a heap of batch material is charged into the molten glass at the charging end of the tank-furnace and the heaps so charged float in the glass partly above and partly submerged. Accordingly the batch material is exposed to widely different temperatures.

The part of each heap above glass level is exposed on all sides to the high temperature of the heating gases and a thin layer of melted batch flows down each heap to the molten glass, on the other hand the submerged part of each heap is more slowly melted since it is exposed to a much lower temperature, which may be several hundred degrees centigrade lower than the temperature at the surface. Furthermore, the submerged portion of the heap is melted in the presence of convection currents in the tank-surface, which tends to separate the ingredients.

The main object of the present invention is to expedite melting of the batch material in an economical manner, and another object is to make glass at a higher heat efficiency than that at present achieved in tank furnaces.

A furnace for melting batch material used in the manufacture of glass according to the present invention comprises an end wall to the furnace at the charging end thereof, a flat platform extending inwardly of the furnace from said end wall, a pair of vertical confining walls erected to extend along each side of the platform and rising upwardly therefrom, means for developing a high temperature over the platform, horizontal transporting means on the platform in contiguity therewith and extending between the said confining walls and actuating means therefor whereby a wedge shaped bank of batch material having vertical sides and a sloping plane upper surface inclined downwardly toward the platform formed over said transporting means between the said confining walls (so that the vertical sides of the bank are supported by the said walls) may be moved bodily forward along the platform by said transporting means, at a rate related to the rate of melting on said sloping upper surface and means for feeding fresh batch material into the back only of the bank across the full width thereof, the rate of moving and feeding being co-ordinated so that the position and outline of the bank remain approximately constant as a molten stream flows therefrom.

The bank of batch material is formed within the furnace as fully described in the said application Serial No. 639,080, and the back of the bank is accessible to any suitable means outside the surface for feeding fresh material into the back of the bank.

The molten stream produced on the sloping upper surface of the bank is free of any admixture with unmelted batch material by so determining the slope that the molten layer flowing down it does not disrupt the underlying unmelted material and all the material converted into the molten stream is melted at a uniform high temperature.

In operating a tank furnace for melting glass according to the invention only high temperature molten material is fed to the main body of molten material in the tank.

Since the conversion of the batch material into a molten stream is effected outside the tank of a tank-furnace a considerable reduction in the size of such tanks can be effected as compared with the size of tanks commonly constructed.

A tank furnace for making glass constructed according to the present invention comprises side walls, and an end wall at the charging end thereof a tank and a flat platform extending from said end wall to the tank of the furnace just above the intended level of a main body of molten glass in the tank, a pair of vertical confining walls within said side walls erected along each side of the platform and rising upwardly therefrom, horizontal transporting means on the platform in contiguity therewith extending between the said confining walls, and actuating means therefor whereby a wedge-shaped bank of batch material having vertical sides and a sloping plane upper surface inclined downwardly towards said tank formed over said transporting means, between the said confining walls (so that the vertical sides of the bank are supported by the walls) may be moved bodily forward along the platform by said transporting means at a rate related to the rate of melting on said sloping plane upper surface, a series of ports located for directing high temperature furnace gases across the sloping face of the bank on the platform and means for feeding fresh batch material into the back of the bank across the full width thereof, the rate of moving and feeding being co-ordinated so that the position and outline of the bank remain approximately constant as a molten stream flows therefrom.

Melting is effected in a layer of batch material on the sloping surface of the bank on the platform and the underlying batch material in the bank protects the supporting structures and the bank moving means from the heat effects of the high temperature gases.

The confining walls are preferably erected on the sides of the platform, but may be constituted by vertical walls erected within the furnace, or by the side walls of the furnace.

Bank maintaining apparatus constructed according to the invention may be entirely separate from the furnace structure so that it can be moved up to the charging end of a furnace and under the end wall at that end, until the platform reaches the tank wall and preferably the confining walls are movable with the platform.

Accordingly a tank furnace in accordance with the present invention may comprise an end wall at the charging end, having a lower edge disposed just above the intended height for the bank to be formed in the furnace, and a movable structure comprising the platform and bank confining walls movable as an entity under the said lower edge of the end wall of the furnace until the front edge of the platform meets the tank wall of the furnace, said structure comprising also means inclined to the platform for supporting the back of the bank, and the transporting means on the platform for moving the bank thereon bodily forward, a batch bin outside the said end wall and means for feeding batch from the bin into the back of the bank across the width thereof over the said inclined support for the back of the bank.

An end wall, having a lower edge disposed close to the top of a bank extending across the furnace substantially for the width of the tank, may be adjustable to the top of the bank. To this end, the end wall is preferably a suspended structure provided with means for altering the disposition of the wall with regard to the top of the bank.

In operation, the end wall being set in position, the wedge shaped bank is built up on the platform and against the confining walls until the desired sloping upper surface is obtained extending from near the front of the platform to the vicinity of the end wall. The high temperature melting gases, that is gases which are at least at a temperature as is usually employed in glass melting in a tank furnace, sweep from one side to the other of the bank so that a molten layer is formed on the bank and commences to move down the bank to form a continually flowing stream of molten material whereby a molten stream flows from the bank and fresh batch material in the bank is continually being uncovered.

As melting takes place the bank is moved bodily forward so that the sloping plane surface regains its original disposition with regard to the platform and the gas ports, and simultaneously fresh batch material is fed into the back of the bank to maintain the outline of the bank approximately constant.

Preferably the molten glass in the tank of the furnace is maintained at a level slightly below the level of the front edge of the platform, and the molten stream formed on the bank then flows from the bank into the main body of molten glass in the tank and is at all times exposed to the high temperature gases.

By the present invention a higher heat efficiency for gas heating tank-furnaces is obtained as compared with that at present achieved in the usual gas-heated furnaces, by melting all the batch material at a high temperature and allowing only molten material to enter the main body of molten glass.

Preferably, the horizontal transporting means employed for bodily moving forward the bank of batch material formed on the platform, is a reciprocating means and the actuating means therefor comprise means for readily and precisely adjusting the stroke of the said moving means according to the rate of melting of the batch material on the bank.

The reciprocating means for moving the bank may comprise a series of bars rigidly connected in spaced relation with each other and with means such as a connecting rod to move the bars to and fro, the bars being supported at the level of the rod and extending between the confining walls, and ramps parallel to the bars and extending between the confining walls but stationary relatively to the bars, said ramps being located across the platform in the spaces between the bars, each of said ramps including a vertical front face which offers resistance to backward movement of the batch material during backward movement of the bars, and an upper face inclined downwards and backwards over which the batch material is moved forwards and upwards by the spaced bars during the forward movement of the actuating connecting rod. The spaced bars of the reciprocating bank-moving means are formed similarly to the ramps, that is to say, to include substantially vertical front faces and upper faces inclined downwards and backwards, thereby the inclined faces of the spaced bars are adapted to assist the vertical faces in moving forward the bank by carrying forward the batch material in the bank disposed over them during their forward movement, and facilitate their rearward movement under the bank. The bars at or near the front of the bank have vertical faces of less depth than the rearward bars in order to maintain the slope of the upper surface of the bank approximately constant.

Where the bank is of considerable width, say for example 20 ft., a plurality of reciprocating means are arranged side by side across the platform, the to and fro movements of the actuating connecting rods being thereby adjustable relatively to one another so as to vary the rates of movement in the bank to counteract the varying rates of melting which occur across the whole of the bank in order to maintain the outline of the bank approximately constant in spite of variations in the rate of melting of the bank.

By such arrangements of bank-moving means the whole bank is moved bodily forward the requisite amount at each excursion of the reciprocating bars.

The bank is fed from a bin arranged outside the furnace in contiguity with the end wall of the furnace, and fresh batch material is fed from the bin into the back of the bank. Any continually operating device may be employed to transfer batch material from the bin into the back of the bank. Thus, reciprocating members, similar to those used for moving the bank forward, may operate on the bottom plate of the bin, this bottom plate being on a level with the outlet from the bin.

Apparatus for maintaining a bank of batch material constructed according to the present invention may comprise a platform, a bin behind the platform, the bottom of said bin being disposed above the level of the platform, feeding means operating on the bottom of the bin to move batch material in the bin towards the platform.

a bell shaped mouth for the bin extending from the bottom front of the bin towards the platform and including a lower wall which gives support, at the back, to the bottom of the bank, to be formed on the platform, and is disposed to guide batch material fed from the bin to the rear of the platform, side walls, and an upper wall limiting the upward travel of the batch material at the back of the bank, and confining side walls carried by the platform, so that batch material fed from the bin into the bell shaped mouth is moved in contiguity with the walls of the bin mouth into the back of a bank formed on the platform and between the said confining walls, and means on the platform for moving the bank formed thereon bodily forward, the rate of forward movement of the bank forming means and of the batch feeding means, being co-ordinated whereby the outline of the bank on the platform remains approximately constant during melting.

Where the bank is of such width as to make it necessary to employ a plurality of bank moving means on the platform, then a corresponding number of batch feeding means will be arranged in the bin in order to co-ordinate the rate of feed with the variations in the rate of melting which occurs across the whole of the bank so as to maintain the outline of the bank approximately constant.

In order that the invention may be more clearly understood a preferred embodiment thereof, as applied to a continuous tank-furnace, will now be described by way of example with reference to the accompanying diagrammatic drawings.

In the drawings:

Figure 1:
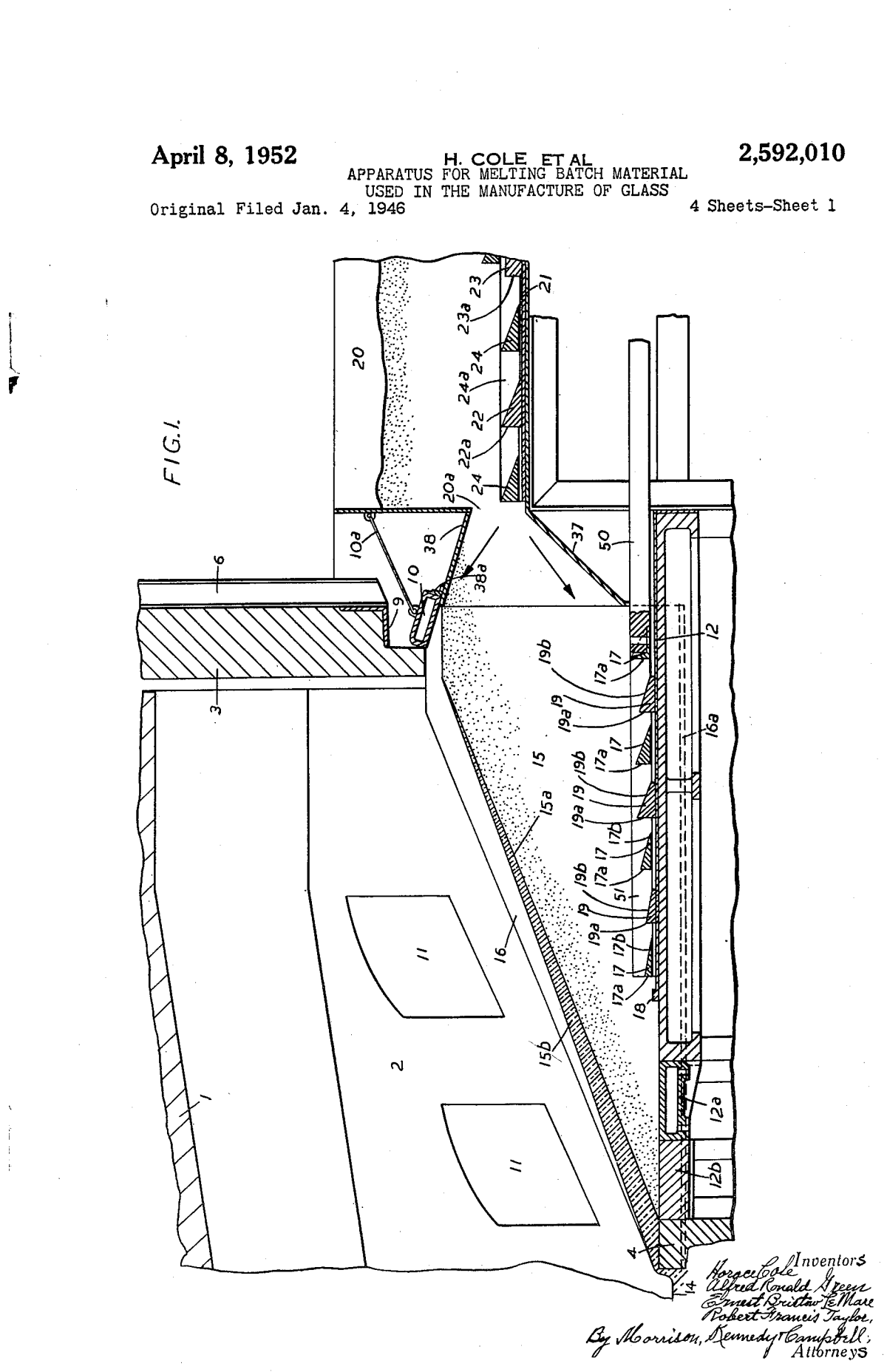

Figure 1 is a longitudinal sectional elevation through the charging end of the furnace;

Figure 2 is a view similar to Figure 1, but to a reduced scale, showing the actuating mechanism for moving the bank moving means and the batch feeding means by which the batch is supplied into the rear of the bank;

Figure 3 is a sectional elevation across the furnace on the line III—III of Figure 2 looking towards the end wall at the charging end; and Figure 4 is a half plan of the apparaus shown in Figure 1 and of the bank moving means supported thereon.

In the drawings like references designate the same parts.

The furnace comprises a crown 1, vertical side walls 2 and a movable end wall 3 at the charging end, under which end wall the platform and bank moving means are pushed up to the tank. The rear end wall of the tank is show at 4.

The end wall 3 is suspended from a support generally indicated at 5, by means of a structure including a cradle 6 suspended by rods 7 which are adjustable in an axial direction by any suitable means, e. g. nuts 8. The bottom of the cradle is secured to an angle member 9 inserted near the lower edge of the end wall; the lower edge is rabbetted, and a water box 10 is partially disposed in the rabbet. The means of suspending and adjusting the height of the lower edge of the end wall from the furnace floor is not further described, the arrangement illustrated being well understood by those skilled in the art.

In each side wall of the furnace are ports 11 for directing high temperature gas alternately in each direction from side to side of the furnace so that melting can be effected by the heat developed over the platform.

The ports are arranged in an inclined plane corresponding to the sloping upper surface of the bank of the batch material to be melted so that the whole surface thereof is continuously subjected to the action of the entering high temperature gases which sweep across from side to side of the bank.

A flat platform 12 of substantially the same width as the tank of the furnace, say about 20 ft., is mounted on a chassis 13 and disposed so that its surface is slightly above the level 14 of the molten glass in the tank. The front part of the platform may be constituted by a row of water boxes 12a and a row of refractory blocks 12b as illustrated. A wedge shaped bank 15 of batch material is formed on the platform 12 and extends forwardly from the end wall 3 to present an inclined plane upper surface 15a sloping towards the tank of the furnace. In order that the molten stream indicated at 15b flowing from the upper surface 15a of the bank 15 shall be nearly as wide as the width of the tank, confining walls 16 for the bank are erected along each side of the platform within side walls 2 of the furnace (see particularly Figure 3) on angle joists 16a fixed alongside the chassis 13 and extending to the front of the refractory blocks 12b. The tops of the confining walls 16 are sloped parallelly to the slope of the ports 11.

Very successful results have been obtained with a platform which is about 11 ft. in depth, i. e., from back to front, on which a bank of material is maintained, the bank at the back having a height of about 3 ft. 6 ins. so that the upper surface of the bank slopes down from the charging end of the furnace to the tank at an angle to the horizontal of about 20° to 25°. The slope is regulated so as to avoid such disrupture of the molten layer flowing down the bank as to permit avalanching of unmelted batch material in the bank. The slope employed is always such that a substantially smooth uniform slope to the bank is obtained without any great variations of steepness. The length of the platform may be such as to give the molten stream leaving the bank an extended period of flow over the substantially level surface of the platform whilst fully exposed to the high temperature gases, and the confining walls extended to constrain the flow of the molten stream towards the tank.

Applicants have found by experiments that such a bank of batch material cannot be moved forward bodily and its outline maintained by a forward pressure applied simultaneously over the whole of the back of the bank, and that, on exerting such a forward pressure, deformation of the bank occurs with consequent rupture of the molten layer on the sloping face of the bank accompanied by extrusion of raw batch, but that by bodily moving forward the bank by engaging the bottom layer of the bank and feeding new batch material into the back of the bank, the outline can be maintained without causing disruption of the molten layer on its sloping face and consequent avalanching of batch material.

In order to move the bank 15 bodily forward as melting proceeds at a rate co-ordinated with the rate of feeding fresh batch material into the back of the bank, there is arranged on the platform 12 a transporting means comprising a plurality of reciprocating means each including a series of parallel bars 17 which are connected together by longitudinal members 51, each reciprocating means being provided with a connecting rod 50 so that each rod 50 actuates to and fro an open grid-like frame (see particularly Figure 4). The plurality of series of bars extend for the full width of the platform 12 and each series is capable of sliding as an entity over the platform as it is actuated by the reciprocation of its rod 50. As indicated in Figure 3 seven series of reciprocating means are employed on the platform. Each of the bars 17 of the bank-moving means present vertical faces 17a which push forward the material in the bottom layer of the bank, whilst their upper faces 17b carry forward the material overlying them.

Experiments have shown that it is preferable for all the bars to have an upper face 17b which is inclined to facilitate the backward movement of the bars under the bank. The vertical faces of the bars progressively increase from front to back whereby the slope of the upper surface of the bank is maintained approximately uniform, the height of the bars depending on the height in the bank above the bars.

In order to minimise backward movement in the bank as the bars 17 are moved backwards, there are disposed between the bars 17 and alternating with them stationary ramps 19 extending across the width of the respective series, each of said ramps 19 presenting a vertical face 19a which obstructs backward movement in the bank. Each series of ramps is mounted on a respective sole plate 18 which sole plates lie side by side on the platform and are removably located thereon, and the several series of the bars 17 and their respective longitudinals 51 rest on the respective sole plates. The ends of the underfaces of each series of ramps 19 are rabbetted to allow the respective longitudinals 51 to pass under them. Further, in order that the introduction of these ramps may not obstruct the forward movement of the bank during the forward movement of the reciprocating bars 17, the ramps 19 have a slope 19b on their upper surfaces which enables the batch material to move forwardly as the reciprocating bars 17 move forwardly with the rod 50.

Experiments have proved that the bank can be moved bodily forward if the bars 17 of each series are spaced apart a distance about equal to twice the width of a bar, the width of a bar from front to back being about six inches whilst the ramps 19 are of substantially the same dimension as the bars 17. Accordingly in the construction illustrated the total area of the bars and ramps when viewed in plan is equal to two-thirds of the area of the platform over which they operate. It will be observed that each rear bar 17 is disposed at the rear of the bank whilst each front bar is spaced rearwardly from the front of the platform the arrangement permitting the bank to be moved bodily forward whilst the bank protects the moving means from the heat of the furnace gases.

Outside the end wall 3 is erected a bin 20 for fresh batch material, the bottom of the bin being disposed at about the level of half the height of the bank at the back. On the bottom of the bin 20 there is a plurality of sole plates 21 corresponding to the number of sole plates on the platform, each sole plate 21 carrying ramps 22, 23 in spaced relation. Each ramp 22 is wedge shaped and each ramp 23 forms a step at the back of the bin, both ramps present vertical faces 22a and 23a respectively towards the mouth 20a of the bin, which mouth is equal in width to the width of the bank on the platform. Each sole plate is fixed over the bottom of the bin so that it can be retracted with its respective ramps 22, 23 from the bin for purposes of repair, and on each sole plate 21 is disposed a frame comprising spaced feed bars 24 connected by their ends to longitudinal members 24a. The forward feed bars in each series which are arranged one to each side of the bar 22 of the respective series are disposed between the longitudinals of the series and the rear feed bar is disposed on the longitudinals to be elevated above the respective step 23. The feed bars 24 are preferably all of the same wedge form as the bars 17 on the platform and each series of bars is connnected to a respective connecting rod 25 behind the back wall of the bin.

With such an arrangement the respective series of feed bars 24 on the bin can be individually given to and fro excursions and push batch material forwardly into the mouth 20a, whilst their wedge shape formation permits them easily to move backwards under the batch material, and during this backward movement the fixed bars by their vertical faces 22a, 23a, oppose backward movement as a whole of the batch material in the bin.

By providing each feed bar 24 which operates over a step 23 in the bin, the material is merely pushed forward and falls off the step on to the respective middle bar thereby direct upward movement of the material in the back of the bin by deflection from the sloping face of the middle bar is avoided.

Each connecting rod 25 is at the rear end hinged to a pivoted lever 26 in turn connected by a pitman 27 to a crank disc 28, the hinge between the connecting rod 25 and lever 26 being adjustable lengthwise of the lever so as to vary the stroke of the feed bars. The reciprocations of the several rods 25 are preferably employed to cause movement in the corresponding bank-moving means whereby the bank is synchronously moved bodily forward as melting on the sloping surface 15a proceeds, each connecting rod 25 being connected to the respective connecting rod 50 of the bank-moving means through levers 29 and 30 both mounted on a pin 30a, the lever 30 in turn being connected by a link 31 and arms 31a to the connecting rod 50 of the bank-moving means.

The connection of the link 31 to lever 30 is adjustable by hand wheel 32 having a threaded end 33 passing through a slidable block 34 which carries the hinge pin by which the link and lever are connected.

Thereby the stroke of each series of reciprocating bars in the bin and of the corresponding bars on the platform may be relatively adjusted to co-ordinate the rate of forward movement of the bank with the rate of melting of the batch material so that the desired outline of the bank is maintained substantially constant, the feeding of batch material being synchronized with the movement of the bank.

Further the rate of movement of the several series of reciprocating bars on the platform are adjustable to one another, whereby the rate of movement may be varied across the bank to neutralise variations in the rate of melting across the bank which may occur, and the rate of feeding into the back of the bank achieved by each series of bars in the bin made to synchronise with the rate of movement of the corresponding bars on the platform.

It may here be observed that with tanks of lesser width than 20 ft. a fewer series of bank moving and corresponding batch feeding means will be employed and with relatively narrow banks a single bank moving and batch feeding means may be employed.

The end wall 3 is as already stated provided with aligned water boxes 10 which extend across the furnace between the bin mouth 20a and the end wall. The bin mouth comprises an apron 37 and a cover plate 38, these members 37 and 38 form upper and lower walls of a bell shaped mouth for the bin of which the confining walls 16 on the platform form the sides.

The plate 38 is provided with a support 38a for the water boxes 10 and the latter are held in position by ties 10a connecting to the boxes and the bin wall, the arrangement permitting a water box to be withdrawn between the bin 20 and the end wall 3 for purposes of repair.

In operation, the bank-moving means move forwardly so that the vertical faces of the bars 17 push forward batch material in a bottom layer of the bank. In synchronism with the movement of the bars 17, the feed bars 24 are advanced and batch material is pushed forward by the feed bars 24 from the bin through the bell-shaped mouth, thereby the fresh material is fed into the back of the bank. By the synchronous movement of the bars 17 and 24 the outline of the bank remains approximately constant and accordingly undisturbed, thereby melting takes place continuously on the upper sloping surface of the bank. A uniform composition is therefore maintained for the bank and for the molten stream flowing therefrom.

By disposing the bottom of the bin about midway of the height of the bank at the back, the batch feeding means operating on the bottom of the bin, pushes fresh material into the back, rather nearer the top than the bottom, and the upper wall of the bell-shaped mouth deflects the natural upward movement of the batch into a forward and upward movement towards the top of the bank whilst the lower wall (or apron) directs the fresh batch into the bottom of the bank, thereby the whole sloping face of the bank is supported by fresh batch material and the gases passing over the sloping faces can find no outlet to the bin.

It will be observed that the bank of batch material wholly protects the bank-moving means, comprising the bars 17, against the effects of the heat of the furnace gases, whilst the bank prevents heat radiation losses under the end wall 3.

Although reciprocating or conveying means have been referred to as a means of feeding batch material to the back of the bank, obviously other means, such as gravity feeding, may be employed so long as it is capable of feeding batch material into the back of the bank at the required rate to maintain the outline of the bank approximately constant during the process of melting.

In the foregoing description the platform is stated to be slightly above the level 14 of the molten glass in the tank, but the platform may be at or slightly below the level of the molten glass, provided that in such case the bank-moving means are raised slightly with regard to the platform in order that they operate at a level above the level of the molten glass in the tank.

From the foregoing it will be observed that in carrying out the present invention a novel principle of operation is involved, namely that the bank is formed at the beginning of the operation and its outline approximately maintained throughout, so that the original composition of the batch material is maintained whilst the batch material in the bank protects the bank-moving means from the heat of the furnace gases. Further, the whole of the batch material is melted at a high temperature and unmelted material cannot reach the main body of molten glass in a tank furnace.

We claim:

1. A furnace for melting batch material used in the manufacture of glass comprising an end wall to the furnace at the charging end thereof, a flat platform extending inwardly of the furnace from said end wall, a pair of vertical confining walls erected to extend along each side of the platform and rising upwardly therefrom, means for developing a high temperature over the platform, horizontal transporting means on the platform in contiguity therewith and extending between the said confining walls, and actuating means therefor, whereby a wedge shaped bank of batch material; having vertical sides and a sloping plane upper surface inclined downwardly toward the platform, formed over said transporting means between the said confining walls (so that the vertical sides of the bank are supported by the said walls), may be moved bodily forward along the platform by said transporting means at a rate related to the rate of melting on said sloping upper surface, and means for feeding fresh batch material into the back only of the bank across the full width thereof, the rate of moving and feeding being co-ordinated so that the position and outline of the bank remain approximately constant as a molten stream flows therefrom.

2. A furnace for melting batch material used in the manufacture of glass comprising side walls, and an end wall at the charging end thereof, a tank, a flat platform extending from said end wall to the tank of the furnace just above the intended level of a main body of molten glass in the tank, a pair of vertical confining walls within said side walls erected along each side of the platform and rising upwardly therefrom, horizontal transporting means on the platform in contiguity therewith extending between said confining walls, and actuating means therefor, whereby a wedge shaped bank of batch material having vertical sides and a sloping plane upper surface inclined downwardly towards said tank over said transporting means, formed between the said confining walls (so that the vertical sides of the bank are supported by the walls), may be moved bodily forward along the platform by said transporting means at a rate related to the rate of melting on said sloping plane upper surface, a series of ports located for directing high temperature furnace gases across the sloping face of the bank on the platform, and means for feeding fresh batch material into the back only of the bank across the full width thereof, the rate of moving and feeding being co-ordinated so that the position and outline of the bank remains approximately constant as a molten stream flows therefrom.

3. Apparatus for maintaining a bank of batch material for use in a furnace according to claim 1, wherein the means for feeding fresh batch material into the back of the bank across the full width thereof comprises a bin for the fresh batch behind the platform, the bottom of said bin being disposed above the level of the platform, ancillary feeding means operating on the bottom of the bin to move batch material in the bin towards the platform, a bell-shaped mouth for the bin extending from the bottom front of the bin towards the platform and including a lower wall which gives support at the back to the bottom of the bank, to be formed on the platform, and is disposed to guide batch material fed from the bin to the rear of the platform, side walls, and an upper wall limiting the upward travel of the batch material at the back of the bank, so that the batch material fed from the bin into the bell-shaped mouth is moved in contiguity with the walls of the bin mouth into the back of a bank formed on the platform and between the said confining walls.

4. A furnace for melting batch material used in the manufacture of glass comprising a tank, side walls and an end wall to the furnace at the charging end, a flat platform extending inwardly from said end wall at about the intended level for a main body of molten glass in the tank, a pair of confining walls erected within said side walls to extend upwardly along each side of the platform and between said end wall and said tank, said confining walls rising above said platform, horizontal transporting means on the platform in contiguity therewith extending between said confining walls, and actuating means therefor, whereby a wedge shaped bank of batch material having vertical sides and a sloping upper surface inclined downwardly towards said tank formed over said transporting means between the said confining walls (so that the vertical sides of the bank are supported by the confining walls) may be moved bodily forward along the platform by said transporting means at a rate related to the rate of melting on said sloping surface, a series of ports located for directing high temperature furnace gases across the sloping face of the bank on the platform, said furnace end wall having a lower edge disposed just above the intended height for the bank to be formed in the furnace, and a movable structure including the platform and bank confining walls, movable as an entity under the said lower edge of the end wall until the front edge of the platform meets the tank of the furnace, said movable structure comprising also means inclined to the platform for supporting the back of the bank, and the transporting means on the platform for moving the bank thereof bodily forward, a batch bin outside the said end wall, and means for feeding fresh batch from the bin into the back only of the bank across the full width thereof over said inclined support for the back of the bank, the rate of moving the bank and feeding fresh batch material being coordinated so that the position and outline of the bank remain approximately constant as a molten stream flows therefrom.

5. A furnace for melting batch material used in the manufacture of glass comprising side walls and a charging end, a vertically movable end wall at the said charging end, a platform extending inwardly of the furnace from the charging end, vertical confining walls within the side walls of the furnace erected to extend inwardly from the charging end and upwardly along each side of the platform, said end wall abutting on said confining walls, means for developing a high temperature over the platform, horizontal transporting means on the platform in contiguity therewith extending between the said confining walls, and actuating means therefor, whereby a wedge shaped bank of batch material having vertical sides and a sloping plane upper surface inclined downwardly towards the platform formed over said transporting means between the said confining walls (so that the vertical sides of the bank are supported by the confining walls) may be moved bodily forward along the platform, at a rate related to the rate of melting on said sloping upper surface, and means for feeding fresh batch material into the back only of the bank across the full width thereof, the rate of moving and feeding being co-ordinated so that the position and outline of the bank remain approximately constant as a molten stream flows therefrom.

6. A furnace for melting batch material used in the manufacture of glass comprising side walls and a vertically adjustable end wall at the charging end of the furnace, a tank, a platform at the charging end, extending from said end wall to the tank just above the intended level of a main body of molten glass in the tank, vertical confining walls within the side walls of the furnace erected to extend upwardly along each side of the platform and between said movable wall and the said tank, said confining walls rising above said platform, horizontal transporting means on the platform in contiguity therewith extending between said confining walls and actuating means therefor, whereby a wedge shaped bank of batch material, having vertical sides and a sloping upper face inclined downwardly towards said tank, formed over said transporting means between the said confining walls (so that the vertical sides of the bank are supported by the confining walls), may be moved bodily forward along the platform by said transporting means at a rate related to the rate of melting on said sloping upper surface, a series of ports located for directing high temperature furnace gases across the sloping face of the bank on the platform, and means for feeding fresh batch material into the back only of the bank across the full width thereof, the rate of moving and feeding being co-ordinated so that the position and outline of the bank remain approximately constant as a molten stream flows therefrom.

7. A furnace for melting batch material used in the manufacture of glass comprising a vertically adjustable end wall at the charging end of the furnace, a tank, a platform at the charging end extending from said end wall of the furnace just above the intended level of a main body of molten glass in the tank, a pair of vertical confining walls erected to extend upwardly along each side of the platform and between said movable wall and said tank, said confining walls rising above said platform, horizontal transporting means on the platform in contiguity therewith extending between said confining walls and actuating means therefor, whereby a wedge shaped bank of batch material, having vertical sides and a sloping upper face inclined downwardly towards said tank, formed on the platform between the said confining walls (so that the vertical sides of the bank are supported by the confining walls) and over said transporting means, may be moved bodily forward along the platform at a rate related to the rate of melting on said sloping surface, a series of ports located for directing high temperature furnace gases across the sloping face of the bank on the platform, a movable structure including the platform and bank confining walls, movable as an entity under the said lower edge of the end wall until the front edge of the platform meets the tank of the furnace, said movable structure comprising also means inclined to the platform for supporting the back of the bank, and the transporting means on the platform for moving the bank thereon bodily forward, a batch bin outside the said end wall, and means for feeding fresh batch from the bin into the back only of the bank across the full width thereof over said inclined support for the back of the bank, the rate of moving the bank and feeding fresh batch material being co-ordinated so that the position and outline of the bank remain approximately constant as a molten stream flows therefrom.

8. A furnace for melting batch material used in the manufacture of glass comprising side walls and an end wall to the furnace at the charging end thereof, a flat platform extending inwardly of the furnace from said end wall adapted to support a wedge shaped bank of batch material having vertical side walls and a sloping upper face, vertical walls within said side walls extending along each side of the platform adapted to confine the said bank (so that the vertical sides of the bank are supported by the confining walls), means for developing a high temperature over the said sloping upper face of the bank on the platform, horizontal transporting means on the platform in contiguity therewith, and actuating means therefor, said transporting means extending between the said confining walls and engaging the bottom layer of the said bank to move it forward whereby the whole bank is moved bodily forward along the platform at a rate related to the rate of melting, means for feeding fresh batch material into the back only of the said bank across the full width thereof, and means for co-ordinating the rate of moving and feeding, whereby the position and outline of the bank may be maintained approximately constant.

9. A furnace for melting batch material used in the manufacture of glass comprising an end wall to the furnace at the charging end thereof, a flat platform extending inwardly of the furnace from said end wall, a pair of vertical confining walls erected to extend along each side of the platform and rising above said platform, means for developing a high temperature over the platform, horizontal transporting means on the platform comprising a series of parallel bars arranged in spaced relation and extending between said confining walls, each bar having a vertical front face and a plane upper face inclining rearwardly from the vertical face to the rear of the bar, rigid longitudinal members connecting the bars, said bars being all of substantially equal width and spaced apart a distance about equal to twice the width of a bar from front to back, ramps fixed midway between and parallel to each pair of bars in said plurality of bars, each said ramp having a vertical front face and an upper face inclining rearwardly from the vertical face, the width of each ramp from front to back being about the same as the width of the bars, and actuating means adapted to reciprocate the bars between the ramps, whereby a wedge shaped bank of batch material, having a sloping plane upper surface inclined downwardly towards the platform, formed over said transporting means (so that the vertical sides of the bank are supported by the said walls), may be moved bodily forward along the platform by said transporting means, at a rate related to the rate of melting on said sloping upper surface, and means for feeding fresh batch material into the back only of the bank across the full width thereof, the rate of moving and feeding being co-ordinated so that the position and outline of the bank remains approximately constant as a molten stream flows therefrom, the front bars of said plurality of bars being disposed rearwardly of the front of the platform, so that all the bars are protected by the bank from the furnace gases.

10. A furnace for melting batch material used in the manufacture of glass comprising an end wall to the furnace at the charging end thereof, a tank, a flat platform at the charging end and extending from said end wall just above the intended level for a main body of molten glass in the tank, a pair of vertical confining walls erected to extend along each side of the platform and between said end wall and said tank, said confining walls rising above said platform, horizontal transporting means on the platform in contiguity therewith, said transporting means comprising a series of parallel bars arranged in spaced relation and extending between said confining walls, each bar having a vertical front face and a plane upper face inclining rearwardly from the vertical face to the rear of the bar, rigid longitudinal members connecting the bars, said bars being all of substantially equal width and spaced apart a distance about equal to twice the width of a bar from front to back, ramps fixed midway between and parallel to each pair of bars in said plurality of bars, each said ramp having a vertical front face and an upper face inclining rearwardly from the vertical face, the width of each ramp from front to back being about the same as the width of the bars, and actuating means adapted to reciprocate the bars between the ramps whereby a wedge shaped bank of batch material, having vertical sides and a sloping upper surface inclined downwardly towards said tank, formed on the platform between the said confining walls (so that the vertical sides of the bank are supported by the confining walls) and over said transporting means, may be moved bodily forward along the platform by said transporting means at a rate related to the rate of melting on said sloping upper surface, a series of ports located for directing high temperature furnace gases across the sloping face of the bank on the platform, and means for feeding fresh batch material into the back only of the bank across the full width thereof, the rate of moving and feeding being co-ordinated so that the position and outline of the bank remain approximately constant as a molten stream flows therefrom, the front bars of said plurality of bars being disposed rearwardly of the front of the platform, so that all the bars are protected by the bank from the furnace gases.

11. A tank furnace according to claim 5, wherein the transporting means, for moving bodily forward a bank of batch material formed on the platform as melting proceeds on the sloping plane upper surface of the bank, comprises a series of parallel bars arranged in spaced relation and extending between said confining walls, each bar presenting a vertical face towards the front of the bank and a plane upper face inclining rearwardly from the vertical face to the rear of the bar, rigid longitudinal members connecting the bars, said bars being all of substantially equal width and spaced apart a distance about equal to twice the width of a bar from front to back, ramps fixed midway between and parallel to each pair of bars in said plurality of bars, each said ramp having a vertical face towards the front of the bank and an upper face inclining rearwardly from the vertical face, the width of each ramp from front to back being about the same as the width of the bars, the front bars of said plurality of bars being disposed rearwardly of the front of the platform, so that all the bars are protected by the bank from the furnace gases.

12. A tank furnace according to claim 6, wherein the transporting means, for moving bodily forward a bank of batch material formed on the platform as melting proceeds on the sloping plane upper surface of the bank, comprises a series of parallel bars arranged in spaced relation and extending between said confining walls, each bar presenting a vertical face towards the front of the bank and a plane upper face inclining rearwardly from the vertical face to the rear of the bar, rigid longitudinal members connecting the bars, said bars being all of substantially equal width and spaced apart a distance about equal to twice the width of a bar from front to back, ramps fixed midway between and parallel to each pair of bars in said plurality of bars, each said ramp having a vertical face towards the front of the bank and an upper face inclining rearwardly from the vertical face, the width of each ramp from front to back being about the same as the width of the bars, the front bars of said plurality of bars being disposed rearwardly of the front of the platform, so that all the bars are protected by the bank from the furnace gases.

13. A tank furnace according to claim 7, wherein the transporting means, for moving bodily forward a bank of batch material formed on the platform as melting proceeds on the sloping plane upper surface of the bank, comprises a series of parallel bars arranged in spaced relation and extending between said confining walls, each bar presenting a vertical face towards the front of the bank and a plane upper face inclining rearwardly from the vertical face to the rear of the bar, rigid longitudinal members connecting the bars, said bars being all of substantially equal width and spaced apart a distance about equal to twice the width of a bar from front to back, ramps fixed midway between and parallel to each pair of bars in said plurality of bars, each said ramp having a vertical face towards the front of the bank and an upper face inclining rearwardly from the vertical face, the width of each ramp from front to back being about the same as the width of the bars, the front bars of said plurality of bars being disposed rearwardly of the front of the platform, so that all the bars are protected by the bank from the furnace gases.

14. A furnace according to claim 9, wherein the transporting means comprises a plurality of series of reciprocating bars and corresponding fixed ramps arranged side by side across the platform, and extending between said confining walls, and individual actuating means respective to each series of reciprocating bars and adjusting means therefor, whereby the to and fro movements of the respective reciprocating means are independently adjustable relatively to one another, so as to counteract any variation in the rate of melting across the bank in order to maintain the outline of the bank approximately constant in spite of variations in the rate of melting on the bank.

15. A furnace according to claim 10, wherein the transporting means comprises a plurality of series of reciprocating bars and corresponding fixed ramps arranged side by side across the platform, and extending between said confining walls, and individual actuating means respective to each series of reciprocating bars and adjusting means therefor, whereby the to and fro movements of the respective reciprocating means are independently adjustable relatively to one another, so as to counteract any variation in the rate of melting across the bank in order to maintain the outline of the bank approximately constant in spite of variations in the rate of melting on the bank.

16. A furnace according to claim 9, wherein the vertical faces of the bars progressively increase in height from front to back.

17. A furnace according to claim 9, comprising a plurality of series of reciprocating bars and corresponding fixed ramps arranged side by side across the platform and extending between said confining walls, the vertical front faces of said bars progressively increasing in height from front to back, actuating means respective to each series of reciprocating bars and adjusting means therefor whereby the to and fro movements of the respective reciprocating means are adjustable relatively to one another, so as to counteract any variation in the rate of melting across the bank in order to maintain the outline of the bank approximately constant in spite of variations in the rate of melting on the bank.

18. In a furnace for melting glass comprising confining side walls, an end wall at the charging end, and a platform extending into the furnace from said end wall, on which platform batch material arranged as a wedge shaped batch is melted, apparatus for maintaining the bank of batch material comprising a bin outside the end wall and behind the platform, the bottom of said bin being disposed at a height which is just above half the height of the bank, feeding means operating on the bottom of the bin to move batch material in the bin towards the platform, a bell-shaped mouth for the bin extending from the bottom front of the bin towards the platform and including a lower wall which gives support at the back, to the bottom of the bank to be formed on the platform, and is disposed to guide batch material fed from the bin to the rear of the platform, side walls, and an upper wall limiting the upward travel of the batch material at the back of the bank, so that the batch material fed from the bin into the bell-shaped mouth is moved in contiguity with the walls of the bin mouth into the back of a bank formed on the platform and between the said confining walls.

19. Apparatus for melting batch material in the manufacture of glass according to claim 4, wherein the means for feeding batch into the back of the bank is so disposed above the level of the platform as to feed the fresh material across the full width of the back of the bank over an area which is just above half the height of the bank.

H. COLE.
A. R. GREEN.
E. B. LE MARE.
R. F. TAYLOR.

REFERENCES CITED

The following references are of record in the file of this patent:

UNITED STATES PATENTS

| Number | Name | Date |
|---|---|---|
| 1,400,830 | Peebles | Dec. 20, 1921 |
| 1,953,034 | Willetts | Mar. 27, 1934 |
| 1,999,761 | Howard | Apr. 30, 1935 |
| 2,137,930 | Turk | Nov. 22, 1938 |
| 2,272,217 | Longenecker | Feb. 10, 1942 |
| 2,284,398 | Kutchka | May 26, 1942 |
| 2,284,420 | Halbach et al. | May 26, 1942 |
| 2,431,799 | Gaffney | Dec. 2, 1947 |

FOREIGN PATENTS

| Number | Country | Date |
|---|---|---|
| 598,058 | Great Britain | Feb. 10, 1948 |